US012118461B2

(12) United States Patent
Rasouli et al.

(10) Patent No.: US 12,118,461 B2
(45) Date of Patent: Oct. 15, 2024

(54) METHODS AND SYSTEMS FOR PREDICTING DYNAMIC OBJECT BEHAVIOR

(71) Applicants: Amir Rasouli, Maple (CA); Mohsen Rohani, Thornhill (CA)

(72) Inventors: Amir Rasouli, Maple (CA); Mohsen Rohani, Thornhill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1007 days.

(21) Appl. No.: 17/097,840

(22) Filed: Nov. 13, 2020

(65) Prior Publication Data

US 2022/0156576 A1 May 19, 2022

(51) Int. Cl.
  *G06N 3/08* (2023.01)
  *B60W 30/095* (2012.01)
  (Continued)

(52) U.S. Cl.
  CPC .......... *G06N 3/08* (2013.01); *B60W 30/0956* (2013.01); *B60W 60/0011* (2020.02); *G06N 3/04* (2013.01);
  (Continued)

(58) Field of Classification Search
  CPC ......... B60W 30/0956; B60W 60/0011; B60W 2554/4046; G06V 10/25; G06V 10/62; G06V 10/7715; G06V 20/58
  See application file for complete search history.

(56) References Cited

U.S. PATENT DOCUMENTS 10,147,324 B1    12/2018    Kuffner, Jr.
2016/0148054 A1*  5/2016    Han ................ G06T 7/269
                                                 382/103
(Continued)

FOREIGN PATENT DOCUMENTS

CN        102096803 A    6/2011
CN        109409191 A    3/2019
(Continued)

OTHER PUBLICATIONS

Malla et al., "TITAN: Future Forecast Using Action Priors", CVPR, 2020.
(Continued)

*Primary Examiner* — Khoi H Tran
*Assistant Examiner* — Tristan J Greiner

(57) ABSTRACT

Methods and systems for predicting behavior of a dynamic object of interest in an environment of a vehicle are described. Time series feature data are received, representing features of objects in the environment, including a dynamic object of interest. The feature data are categorized into one of a plurality of defined object categories. Each categorized set of data is encoded into a respective categorical representation that represents temporal change of features within the respective defined object category. The categorical representations are combined into a single shared representation. A categorical interaction representation is generated based on the single shared representation that represents contributions of temporal change in each defined object category to a final time step of the shared representation. The categorical interaction representation together with data representing dynamics of the objects in the environment and data representing a state of the vehicle are used to generate predicted data representing a predicted future behavior of the dynamic object of interest.

20 Claims, 5 Drawing Sheets

(51) Int. Cl.
*B60W 60/00* (2020.01)
*G06N 3/04* (2023.01)
*G06V 10/25* (2022.01)

(52) U.S. Cl.
CPC ..... *G06V 10/25* (2022.01); *B60W 2554/4046* (2020.02)

(56) References Cited

U.S. PATENT DOCUMENTS

| | | | | |
|---|---|---|---|---|
| 2016/0357188 | A1* | 12/2016 | Ansari | G05D 1/0274 |
| 2017/0083766 | A1* | 3/2017 | Risinger | G06T 7/246 |
| 2017/0124476 | A1* | 5/2017 | Levinson | G06V 20/58 |
| 2018/0012082 | A1* | 1/2018 | Satazoda | G06V 10/763 |
| 2019/0152490 | A1* | 5/2019 | Lan | G06V 20/58 |

FOREIGN PATENT DOCUMENTS

| | | |
|---|---|---|
| CN | 110136254 A | 8/2019 |
| CN | 110298278 A | 10/2019 |
| CN | 111723835 A | 9/2020 |
| JP | 2006160111 A | 6/2006 |
| JP | 4900211 B2 | 3/2012 |
| WO | 2008004963 A1 | 1/2008 |

OTHER PUBLICATIONS

Mohamed et al., "Social-STGCNN: A Social Spatio-Temporal Graph Convolutional Neural Network for Human Trajectory Prediction", CVPR, 2020.
Sun et al., "Recursive Social Behavior Graph for Trajectory Prediction", CVPR, 2020.
Liang, Junwei, et al. "Peeking into the future: Predicting future person activities and locations in videos." CVPR. 2019.
Hu et al., "Collaborative Motion Prediction via Neural Motion Message Passing", CVPR, 2020.
Iu et al. "Spatiotemporal relationship reasoning for pedestrian intent prediction." ICRA 2020.
Kosaraju et al., "Social-Bigat: Multimodal Trajectory Forecasting Using Bicycle-Gan and Graph Attention Networks", NeurIPS, 2019.
Chandra et al., "Traphic: Trajectory Prediction in Dense and Heterogeneous Traffic Using Weighted Interactions", CVPR, 2019.
Gupta et al., "Social Gan: Socially Acceptable Trajectories With Generative Adversarial Networks", CVPR, 2018.
Alahi et al., "Social Lstm: Human Trajectory Prediction in Corwded Spaces", CVPR, 2016.
Luong et al., "Effective Approaches to Attention-based Neural Machine Translation", arXiv:1508.04025v5 [cs.CL], Sep. 20, 2015.

* cited by examiner

METHODS AND SYSTEMS FOR PREDICTING DYNAMIC OBJECT BEHAVIOR

FIELD

Examples of the present disclosure relate methods and systems for generating predictions of dynamic object behavior, including methods and systems for generating predictions of dynamic object behavior in a sensed environment of an autonomous vehicle.

BACKGROUND

Machine-learning based behavior prediction units are used in many practical systems such as autonomous driving systems or advanced-driver assistance systems for vehicles. It is important for autonomous driving systems or advanced-driver assistance systems to be able to generate accurate predictions of how dynamic objects will behave (e.g., how a pedestrian will move when crossing a street) in a sensed environment (i.e. an environment surrounding the vehicle sensed by sensors of the vehicle), so that a desired path for the vehicle (e.g., to avoid striking a pedestrian crossing a street) can be planned or feedback can be provided to a driver of a vehicle. A factor in generating useful and accurate predictions of how dynamic objects will behave in the sensed environment is the ability to encode the interactions between the dynamic objects in the sensed environment, in order to define how the behavior of dynamic objects impact each other. Encoding interactions between dynamic objects in the sensed environment, and in particular encoding interactions between dynamic objects in the sensed environment, can be challenging due to the complex spatiotemporal nature of the problem.

Many existing approaches for modelling interactions often encode the interactions between an individual dynamic object and other objects (also referred to in some context as agents) in the sensed environment. Encoding interactions between respective individual dynamic objects and other dynamic objects in a sensed environment and training a model of a machine-learning based prediction unit to generate accurate predictions of how the respective individual dynamic objects will behave using encoded data representing interactions between the respective individual dynamic objects and other dynamic objects may be effective in some contexts. However, such an approach typically is not scalable to larger or more complex environments where there is a large number of dynamic objects or a highly variable number of dynamic objects in the environment (e.g., in a busy intersection). Many existing models for generating accurate predictions of how an individual dynamic objects will behave from interactions between the individual dynamic object and other dynamic objects in a sensed environment require an estimation of the number of other objects (including both dynamic objects and static objects) interacting with the individual dynamic object, which is not always possible. Another existing approach for modelling interactions is to use a form of embedding to create fixed size representations of the interactions of the individual dynamic object with other dynamic objects in the environment, for processing by machine learned models. However, such an approach to modelling interactions between dynamic objects necessarily loses some information about the interactions between dynamic objects. As the number of dynamic objects interacting with each other increases, the embedding can result in unacceptably high loss of information.

Accordingly, it would be useful to provide a machine learning-based technique for encoding interactions between dynamic objects, and for generating accurate predictions of how dynamic objects will behave in a sensed environment.

SUMMARY

In various examples, the present disclosure describes methods and systems for encoding interactions between different categories of dynamic and static objects in a sensed environment (i.e. an environment surrounding a vehicle that is sensed by various sensors of a vehicle) into a single unified representation of interactions in the sensed environment. The single unified representation is provided as input to a behavior predictor to generate a prediction of future behavior of one or more dynamic objects of interest (i.e. how the target dynamic object will behave in the sensed environment). The predicted future behavior of the target dynamic in the sensed environment may be further provided as input to a motion planner of an autonomous driving system (ADS) or an advanced-assistive driving system (ADAS) of a vehicle, to enable motion planning that accounts for the predicted behavior of the target dynamic object in the sensed environment.

In examples described herein, dynamic and static objects of the sensed environment are grouped into different object categories based on some shared characteristic (e.g. object class), and the interactions between different categories of dynamic and static objects are encoded. Such encoding of interactions between different categories of dynamic and static objects in a sensed environment is referred to as a categorical encoding. In contrast to conventional modelling of interactions between dynamic objects in as a sensed environment which requires a complex model to encode a variable number of individual dynamic objects in the sensed environment, the categorical encoding method of the present disclosure is less complex and more computationally efficient. The object categories may be predefined, and may be defined by any suitable characteristic depending on the desired application (e.g., categories may be defined by different object classes, where the classes of interest are dependent on the environment of interest).

Because the categories and number of categories are predefined, the computation time and memory resources required to encode interactions between categories of dynamic and static objects can be fixed. Examples of the present disclosure may be scalable to enable prediction of behavior of a target dynamic object, such as pedestrian or other vehicle, in large or complex environments, with little or no increase in required computation time or memory resources.

Examples of the present disclosure may be used in various applications, including autonomous driving, drone piloting, anomaly detection, assistive robotics, or intelligent traffic management, among others.

In some example aspects, the present disclosure describes a method for predicting behavior of a dynamic object of interest in an environment of a vehicle. The method includes: receiving a plurality of time series of feature data, each time series of feature data representing a respective feature of a plurality of objects in the environment over a plurality of time steps, the plurality of objects including a dynamic object of interest. The method also includes categorizing each time series of feature data into one of a plurality of defined object categories, to obtain a categorized set of data for each defined object category, each categorized set of data containing one or more time series of feature data representing one or more objects belonging to the respective defined object category and encoding each categorized set of data into a respective categorical representation, each categorical representation representing temporal change of features within the respective defined object category. The method also includes combining the categorical representations into a single shared representation, generating, a categorical interaction representation, where the categorical interaction representation is a weighted representation of contributions of temporal change in each defined object category to a final time step of the shared representation, and generating predicted data representing a predicted future behavior of the dynamic object of interest based on the categorical interaction representation, data representing dynamics of the plurality of objects and data representing a state of the vehicle.

In any of the above examples, combining the categorical representations may include concatenating the categorical representations according to time step, to generate the single shared representation.

In any of the above examples, encoding each categorized set of data may include: for a given categorized set of data belonging to a given object category, providing the one or more time series of feature data to a trained neural network to generate a time series of feature vectors as the categorical representing for the given object category.

In any of the above examples, the trained neural network may be a recursive neural network, a convolutional neural network, or a combined recursive and convolutional neural network.

In any of the above examples, at least one defined object category may be specific to the dynamic object of interest.

In any of the above examples, the method may include: receiving a time series of sensor data generated by a sensor; and preprocessing the time series of sensor data into one time series of feature data, the one time series of feature data being included in the received plurality of time series of feature data.

In any of the above examples, the vehicle is an autonomous vehicle and the method may include: providing the predicted data representing the predicted future behavior of the dynamic object of interest to a motion planning subsystem of an autonomous vehicle, to generate a planned path for the autonomous vehicle.

In some example aspects, the present disclosure describes a computing system for predicting behavior of a dynamic object of an object of interest in an environment of a vehicle. The computing system includes a processor system configured to execute instructions to cause an object behavior prediction subsystem of the computing system to: receive a plurality of time series of feature data, each time series of feature data representing a respective feature of a plurality of objects in the environment over a plurality of time steps, the plurality of objects including a dynamic object of interest; categorize each time series of feature data into one of a plurality of defined object categories, to obtain a categorized set of data for each defined object category, each categorized set of data containing one or more time series of feature data representing one or more objects belonging to the respective defined object category; encode each categorized set of data into a respective categorical representation, each categorical representation representing temporal change of features within the respective defined object category; combine the categorical representations into a single shared representation; generate a categorical interaction representation based on the single shared representation, the categorical interaction representation being a weighted representation representing contributions of temporal change in each defined object category to a final time step of the shared representation; and generate predicted data based on the categorical interaction representation, data representing dynamics of the plurality of objects, and data representing a state of the vehicle the predicted data representing a predicted future behavior of the dynamic object of interest.

In some examples, the processing system may be configured to execute instructions to perform any of the methods described above.

In some example aspects, the present disclosure describes a computer readable medium comprising computer-executable instructions to implement an object behavior prediction subsystem to predict behavior of a dynamic object of interest in a sensed environment of a vehicle. The instructions, when executed by a processing system of a computing system, cause the computing system to: receive a plurality of time series of feature data, each time series of feature data representing a respective feature of a plurality of objects in an environment over a plurality of time steps, the plurality of objects including a dynamic object of interest; categorize each time series of feature data into one of a plurality of defined object categories, to obtain a categorized set of data for each defined object category, each categorized set of data containing one or more time series of feature data representing one or more objects belonging to the respective defined object category; encode each categorized set of data into a respective categorical representation, each categorical representation representing temporal change of features within the respective defined object category; combine the categorical representations into a single shared representation; generate a categorical interaction representation based on the single shared representation, the categorical interaction representation being a weighted representation representing contributions of temporal change in each defined object category to a final time step of the shared representation; and generate predicted data based on the categorical interaction representation, data representing dynamics of the plurality of objects, and data representing a state of the vehicle, the predicted data representing a predicted future behavior of the dynamic object of interest.

In some examples, the instructions may cause the computing system to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
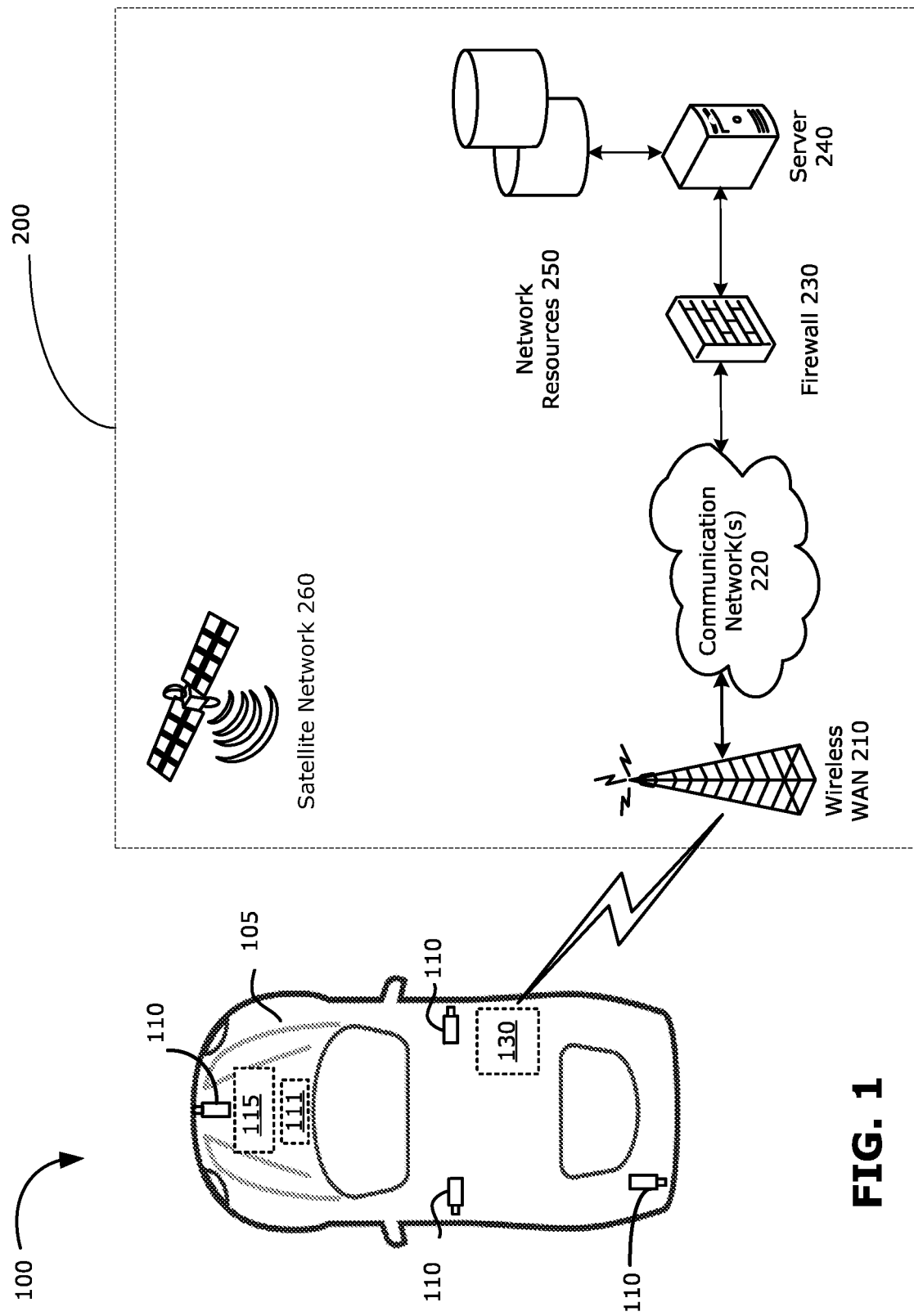
FIG. 1 is a schematic diagram showing an example environment in which an autonomous vehicle operates, in accordance with some embodiments of the present disclosure.

The following describes technical solutions of this disclosure with reference to accompanying drawings.

Some examples of the present disclosure are described in the context of autonomous vehicles. Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also called unmanned aerial vehicles (UAVs)), warehouse equipment, manufacturing facility equipment, construction equipment, farm equipment, autonomous service robots such as vacuum cleaners and lawn mowers, and other robotic devices. Autonomous vehicles may include vehicles that do not carry passengers as well as vehicles that do carry passengers.

Examples of the present disclosure may be applicable in applications other than autonomous vehicles. For example, examples of the present disclosure may be applicable in the context of automated driving systems (ADS) for autonomous vehicle, advanced driver-assistance systems (ADAS) for semi-autonomous vehicles, assistive robotics (e.g., to enable assistive robotics to properly respond to predicted dynamic object behavior in the environment), anomaly detection (e.g., to enable prediction of dynamic object behavior that stands out from the expected or predicted behavior of other dynamic objects), or intelligent traffic management (e.g., to enable prediction of traffic behavior at an intersection), among others. The example methods and systems described herein may be applicable in any context where it would be useful or desirable to accurately predict the behavior of a one or more dynamic objects of interest (otherwise referred to individually as target dynamic object and collective to as target dynamic objects) in a sensed environment (also referred to as a sensed scene). A dynamic object is any object in the environment whose state (e.g., position) changes over a time duration of interest (e.g., over 10 minutes). A static object is any object in the environment whose state (e.g., position) has little or no change (e.g., position change is within a predefined margin, such as 1 meter) over the time duration of interest.

The methods and systems described in examples herein may be used for training an object behavior predictor, which, after being trained, may be deployed to an ADS of an autonomous vehicle or an ADAS of a vehicle. In the disclosed methods and systems, feature data representing sensed objects (including static objects and dynamic objects, also referred to as elements of the environment or scene elements) and sensed features in an environment are grouped together according to defined object categories. The interactions between the object categories are encoded, instead of interactions of individual objects and features. The encoded representation of categorical interactions is used as input to predict behavior of dynamic objects in the environment. Thus, the disclosed methods and systems provide the technical effect that the behavior of dynamic objects can be predicted without having to process the interactions of every individual object in the environment. A further technical effect is that a trained object behavior predictor can be implemented using a less complex machine-learning architecture, using fewer computation time and/or using fewer memory resources.

Accurate behavior prediction of an object of interest is important in the context of autonomous driving or assistive driving, at least to ensure the safety of vehicle occupants and other humans in the environment. A challenges in designing and implementing behavior prediction models for predicting a behavior of an object of interest in a sensed environment is the problem of how to encode the interactions between different objects in the sensed environment. It is important to accurately represent information about how dynamic objects in the environment interact with each other, because such interaction may affect how dynamic objects will move at a future time.

In the present disclosure, an interaction refers to how an object of interest behaves due to the presence of other objects in the environment. As will be discussed further below, the interaction may be weighted based on how strongly another object affects the behavior of the object of interest. For example, a low (or zero) interaction (which may be assigned a low weight) may be determined if the object of interest behaves the same regardless of whether the other objects are in the sensed environment, and a high interaction (which may be assigned a high weight) may be determined if the object of interest drastically changes behavior due to the presence of the other object in the environment. An interaction may be between a dynamic object of interest and other dynamic object(s) of interest (e.g., a walking pedestrian avoiding another walking pedestrian), or between a dynamic object of interest and other static object(s) of interest (e.g., a walking pedestrian avoiding a hydrant in the sidewalk). In some examples, an interaction may also be the object of interest changing behavior due to the semantic meaning represented by another object in the environment (i.e., not due to the mere presence of the other object) (e.g., a walking pedestrian may stop walking if a traffic light changes to red).

Some existing state of the art solutions model interactions between respective individual objects and other objects by considering the potential interactions between all individual dynamic objects (e.g., road users such as individual vehicles, individual pedestrians and/or individual bicyclists). Such solutions typically rely on trajectories and location information of all of the dynamic objects in an environment, and omit interactions between dynamic objects and static objects (e.g., road markings, signs, traffic signals, etc.). Solutions based on modeling interactions between an object of interest and each individual objects are typically not scalable (or have limited scalability), and are difficult or not possible to adapt to environments with highly variable numbers of objects. Another drawback of solutions based on modeling interactions with individual objects is that modeling of interactions between all individual objects can be difficult (e.g. requiring a machine learned model having excessive complexity) and/or computationally prohibitive (e.g., requiring excessive computation time, processing power and/or memory resources) when modeling interactions between large numbers of objects (e.g., when there are 20 or more dynamic objects in the environment). This is because an approach based on interactions of individual objects requires an estimation of the number of interacting object, and the computation complexity (and hence required memory resources and computation time) increases with the number of interacting elements. Further, the representation of a variable number of individual objects and interactions require a transformation to a fixed size representation in order to make it usable in a machine learning. Such a transformation may be difficult to define, or may result in significant loss of information.

Existing solutions typically address these challenges in one of two ways. One approach is to define a limit for the number of individual objects whose interactions with other objects are to be modelled. However, it may be difficult to define a suitable limit for the number of individual objects whose interactions with other objects are to be modelled in a highly variable environment (e.g., where traffic density is mixed and has large variation). Another approach is to use an embedding mechanism to convert variable size representation (e.g., representing a variable number of dynamic objects in the environment) to a fixed size representation. However, such an embedding mechanism may result in significant loss of information when encoding a fixed size representation of a large number of dynamic objects.

In the present disclosure, examples methods and systems are described which model interactions by encoding interactions between defined categories of objects (or object features), rather than modelling interactions between respective individual objects and other objects in an environment. This may help to reduce the computational cost and model complexity for encoding interactions and generating predictions of dynamic object behavior (i.e., predictions of the behavior of a dynamic object of interest in a sensed environment), compared some existing solutions (e.g., as described above).

Generally, predictions of dynamic object behavior may be generated by a neural network. For ease of understanding, the following describes some concepts relevant to neural networks and some relevant terms that may be related to example neural networks that predict dynamic object behavior of an object of interest disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, ... n, n is a natural number greater than 1, $W_s$ is a weight (or coefficient) of $x_s$, b is an offset (i.e. bias) of the neuron and f is an activation function of the neuron and used to introduce a nonlinear feature to the neural network, to convert an input of the neuron to an output. The output of the activation function may be used as an input to a neuron of a following convolutional layer in the neural network. The activation function may be a sigmoid function, for example. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may be described as follows. Briefly, the operation at each layer is indicated by the following linear relational expression: $\vec{y}=\alpha(W\vec{x}+\vec{b})$, where $\vec{x}$ is an input tensor, $\vec{y}$ is an output tensor, $\vec{b}$ is an offset tensor, W is a weight (also referred to as a coefficient), and $\alpha(.)$ is an activation function. At each layer, the operation is performed on an input tensor $\vec{x}$, to obtain an output tensor $\vec{y}$.

Because there is a large quantity of layers in the DNN, there is also a large quantity of weights W and offset vectors $\vec{b}$. Definitions of these parameters in the DNN are as follows, where the weight W is used as an example. In this example, in a three-layer DNN (i.e. a DNN with three hidden layers), a linear weight from a fourth neuron at a second layer to a second neuron at a third layer is denoted as $W_{24}^3$. The superscript 3 indicates a layer (i.e., the third layer (or layer-3) in this example) of the weight W, and the subscript indicates the output is at layer-3 index 2 (i.e., the second neuron of the third layer) and the input is at layer-2 index 4 (i.e., the fourth neuron of the second layer). Generally, a weight from a k-th neuron at an (L−1)-th layer to a j-th neuron at an L-th layer may be denoted as $W_{jk}^L$. It should be noted that there is no W parameter at the input layer.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN.

A convolutional neural network (CNN) is a DNN with a convolutional structure. The CNN includes a feature extractor consisting of a convolutional layer and a sub-sampling layer. The feature extractor may be considered as a filter. A convolution process may be considered as performing convolution on a two-dimensional (2D) input image or a convolutional feature map using a trainable filter.

The convolutional layer is a layer of neurons at which convolution processing is performed on an input in the CNN. In a convolutional layer, one neuron may be connected only to a subset of neurons (i.e., not all neurons) in neighboring layers. That is, a convolutional layer generally is not a fully connected layer. One convolutional layer usually includes several feature maps, and each feature map may be formed by some neurons arranged in a rectangle. Neurons at a same feature map share weights. The shared weights may be collectively referred to as a convolutional kernel. Typically, a convolutional kernel is a 2D matrix of weights. It should be understood that the convolutional kernel may be unrelated to a manner and position of image information extraction. A hidden principle behind convolutional layers is that statistical information of a part of an image is the same as that of another part of the image. This means that image information learned from one part of the image may also be applicable for another part of the image. A plurality of convolutional kernels may be used at the same convolutional layer to extract different image information.

Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

In the process of training a DNN, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the predicted value outputted by the DNN is sufficiently converged with the desired target value). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

A recurrent neural network (RNN) is a type of neural network (usually a DNN) that is often used to process sequence data, where there is expected to be some relationship in the sequential order of the data (e.g., in a set of temporal data containing data over a sequence of time steps, or in set of text data where information is encoded in the order of the words in the text). For example, to predict a word in a sentence, a previous word is usually needed, because the likelihood of a predicted word is dependent on the previous word(s) in a sentence. In RNNs, computation of a current predicted output of a sequence is also related to a previous output. Conceptually, a RNN may be understood as "memorizing" previous information and applying the previous information to computation of the current predicted output. In terms of the neural network layers, the nodes between the hidden layers are connected such that an input to a given hidden layer includes an output from a preceding layer, and additionally includes an output generated by the hidden layer from a previous input. This may be referred to as parameter sharing, because parameters (e.g., layer weights) are shared across multiple inputs to the layer. Thus, the same input to the hidden layer, provided at different sequential position in the sequence data, can result in different output being generated by the hidden layer depending on previous inputs in the sequence. A RNN may be designed to process sequence data of any desired length.

Training of the RNN may be similar to the training of a conventional CNN or DNN. The error backpropagation algorithm may also be used. To account for the parameter sharing in the RNN, in a gradient descent algorithm, the output of each gradient step is calculated from the weights of a current step, and additionally from the weights of several previous steps. The learning algorithm for training the RNN may be referred to as back propagation through time (BPTT).

To assist in understanding the present disclosure, an example of an autonomous vehicle in an environment is now discussed. It should be understood that the present disclosure is not intended to be limited to implementation in the context of autonomous vehicles.

FIG. 1 is a schematic diagram showing an example environment 100 in which a vehicle 105 operates. Examples of the present disclosure may be implemented in the vehicle 105, for example to enable autonomous or semi-autonomous driving. The environment 100 includes a communication system 200 that communicates with the vehicle 105. The vehicle 105 includes a vehicle control system 115. The vehicle control system 115, is coupled to a drive control system and a mechanical system of the vehicle 105, as described further below with reference to FIG. 2. The vehicle control system 115 can, in various examples, enable the vehicle 105 to be operable in one or more of a fully-autonomous, semi-autonomous or fully user-controlled mode.

The vehicle 105 may include sensors, shown here as a plurality of environment sensors 110 that collect information about the external environment 100 surrounding the vehicle 105 and generate sensor data indicative of such information, and a plurality of vehicle sensors 111 that collect information about the operating conditions of the vehicle 105 and generate vehicle data indicative of such information. There may be different types of environment sensors 110 to collect different types of information about the environment 100, as discussed further below. In an example embodiment, the environment sensors 110 are mounted to and located at the front, rear, left side and right side of the vehicle 105 to collect information about the external environment 100 located in front, rear, left side and right side of the vehicle 105. For individual units of the environment sensors 110, may be mounted or otherwise located on the vehicle 105 to have different overlapping or non-overlapping fields of view (FOVs) or coverage areas to capture data about the environment 100 surrounding the vehicle 105. The vehicle control system 115 receives sensor data indicative of collected information about the external environment 100 of the vehicle 105 as collected by the environment sensors 110.

The vehicle sensors 111 provide vehicle data indicative of collected information about the operating conditions of the vehicle 105 to the vehicle control system 115 in real-time or near real-time. For example, the vehicle control system 115 may determine a linear speed of the vehicle 105, angular speed of the vehicle 105, acceleration of the vehicle 105, engine RPMs of the vehicle 105, transmission gear and tire grip of the vehicle 105, among other factors, using vehicle data indicative of information about the operating conditions of the vehicle 105 provided by one or more of the vehicle sensors 111.

The vehicle control system 115 may include or be coupled to one or more wireless transceivers 130 that enable the vehicle control system 115 to communicate with the communication system 200. For example, the wireless transceiver(s) 130 may include one or more cellular (RF) transceivers for communicating with a plurality of different radio access networks (e.g., cellular networks) using different wireless data communication protocols and standards. The wireless transceiver(s) 130 may communicate with any one of a plurality of fixed transceiver base stations of a wireless wide area network (WAN) 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 may be connected to network resources 250, such as supplemental data sources that may provide information to be used by the vehicle control system 115.

The wireless transceiver(s) 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol. The wireless transceiver(s) 130 may also comprise a short-range wireless transceiver, such as a Bluetooth® transceiver, for communicating with a mobile computing device, such as a smartphone or tablet. The wireless transceiver(s) 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication system 100 also includes a satellite network 260 comprising a plurality of satellites. The vehicle control system 115 may use signals from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 2:
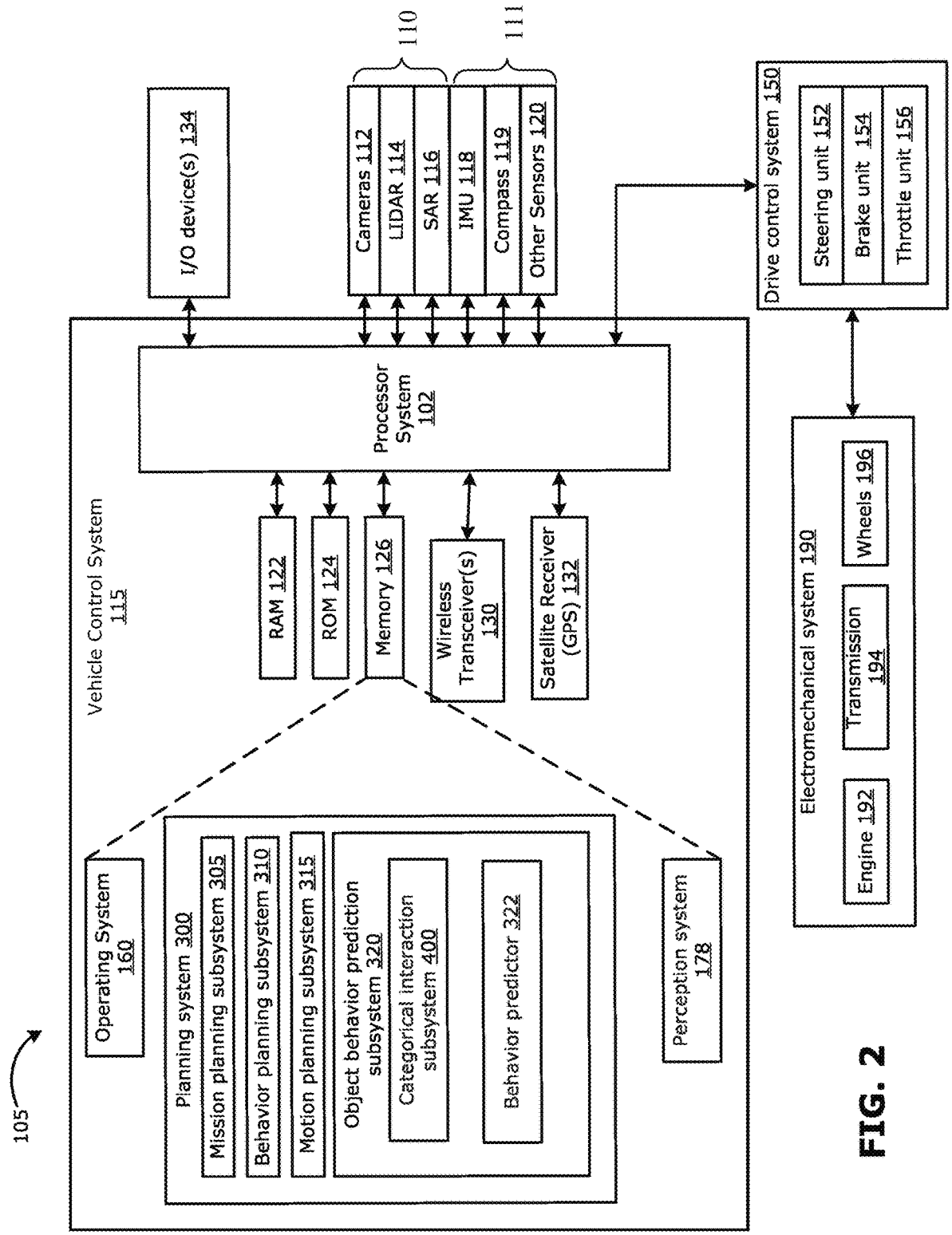
FIG. 2 is a block diagram illustrating some example components of an autonomous vehicle, in accordance with some embodiments of the present disclosure.

FIG. 2 illustrates selected components of the vehicle 105 in accordance with some examples described herein. The vehicle 105 includes a vehicle control system 115 that is coupled to a drive control system 150 and an electromechanical system 190. The vehicle control system 115 is also coupled to receive data from the environment sensors 110 and the vehicle sensors 111.

The environment sensors 110 may, for example, include one or more camera units 112, one or more light detection and ranging (LIDAR) units 114, and one or more radar units such as synthetic aperture radar (SAR) units 116, among other possibilities. Each type of sensor unit 112, 114, 116, may collect respective different information about the environment 100 external to the vehicle 105, and may provide sensor data to the vehicle control system 115 in respectively different formats. For example, a camera unit 112 may provide camera data representative of a digital image, a LIDAR unit 114 may provide a two or three-dimensional point cloud, and the SAR unit may provide radar data representative of a radar image.

The vehicle sensors 111 may include, for example, an inertial measurement unit (IMU) 118 that senses the vehicle's 105 specific force and angular rate and that provides data about an orientation of the vehicle based on the sensed specific force and angular rate. The vehicle sensors 111 may also include an electronic compass 119, and other vehicle sensors 120 such as a speedometer, a tachometer, wheel traction sensor, transmission gear sensor, throttle and brake position sensors, and steering angle sensor.

The vehicle control system 115 may also collect information about a position of the vehicle 105 using signals received from the satellite network 260, via a satellite receiver 132 and generate positioning data representative of the position of the vehicle 105.

The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to the drive control system 150, a Random Access Memory (RAM) 122, a Read Only Memory (ROM) 124, a persistent (non-volatile) memory 126 such as flash erasable programmable read only memory (EPROM) (flash memory), the wireless transceiver(s) 130, the satellite receiver 132, and one or more input/output (I/O) devices 134 (e.g., touchscreen, speaker, microphone, display screen, mechanical buttons, etc.). The processor system 102 may include one or more processing units, including for example one or more central processing units (CPUs), one or more graphical processing units (GPUs), one or more tensor processing units (TPUs), and other processing units.

The drive control system 150 provides control signals to the electromechanical system 190 to effect physical control of the vehicle 105. When in fully or semi-autonomous driving mode, for example, the drive control system 150 receives a planned action (as discussed further below) from the vehicle control system 115 and translates the planned action into control signals using a steering unit 152, a brake unit 154 and a throttle (or acceleration) unit 156. Each unit 152, 154, 156 may be implemented as software module(s) or control block(s) within the drive control system 150. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

The memory 126 of the vehicle control system 115 has stored thereon software instructions that are executable by the processor system 102. The software instructions may be executed by the processor system 102 to implement one or more software systems, software subsystems, and software modules. Generally, it should be understood that software systems, software subsystems, and software modules disclosed herein may be implemented as a set of instructions stored in the memory 126. For example, the memory 126 may include executable instructions for implementing an operating system 160 and an ADS or an ADAS which includes a planning system 300 (also referred to as a path planning system). The planning system 300 may be a machine-learning based system that generates a planned path (which may include planned sub-paths and planned behaviors) to be executed by the vehicle 105. The planning system 300 includes a mission planning subsystem 305, a behavior planning subsystem 310, a motion planning subsystem 315, and an object behavior prediction subsystem 320. The object behavior prediction subsystem 320 further includes a categorical interaction subsystem 400 and a behavior predictor 322. Details of the categorical interaction subsystem 400 will be provided further below.

Planning and decision making by the planning system 300 may be dynamic, and be repeatedly performed as the environment changes. Changes in the environment may be due to movement of the vehicle 105 (e.g., vehicle 105 approaches a newly-detected obstacle) as well as due to the dynamic nature of the environment (e.g., moving pedestrians and other moving vehicles).

The planning subsystems 305, 310, 315 perform planning at different levels of detail. Mission level planning by the mission planning subsystem 305 is considered to be a higher (or more global) level of planning, motion level planning by the motion planning subsystem 315 is considered to be a lower (or more localized) level of planning, and behavior level planning by the behavior planning subsystem 310 is considered to be a level of planning between mission and motion level. Generally, the output from a higher level planning subsystem may form at least part of the input to a lower level planning subsystem.

Planning by the mission planning subsystem 305 (more simply referred to as mission planning) relates to planning a path for the vehicle 105 at a high, or global, level, for example planning a travel route from a starting point (e.g., a home address) to a final destination point (e.g., a work address). The behavior planning subsystem 310 may receive a planned route from the mission planning subsystem 305. The behavior planning subsystem 310 relates to controlling the behavior of the vehicle 105 on a more localized and short-term basis than the mission planning subsystem 305. The behavior planning subsystem 310 may generate a behavior decision that is in accordance with certain rules (e.g., traffic rules, such as speed limit or signage) or guidance (e.g., guidance for smooth and efficient driving, such as taking a faster lane if possible). The behavior decision may be provided as part of the input to the motion planning subsystem 315. The motion planning subsystem 315 relates to controlling the motion of the vehicle 105 based on its immediate environment 100. The motion planning subsystem 315 generates planning vehicle motion to ensure safety of the vehicle occupants and other objects (e.g., pedestrians, other vehicles, bicyclists, etc.) in the environment. Because the environment may be highly dynamic (e.g., pedestrians and other vehicles are all moving), the motion planning subsystem 315 should perform motion planning that is able to account for expected (or predicted) changes in the environment 100.

Sensor data received from the environment sensors 110 and vehicle data received from the vehicle control sensors 111 (and optionally also positioning data collected from the satellite network 260) may be used by a perception system 178 of the ADS and ADAS to generate processed data (e.g., feature vectors, occupancy grid maps (OGMs), object classifications and bounding boxes, etc.) representing features of the environment 100. The perception system 178 may include one or more machine-learning based system (e.g., trained neural networks) that generate processed data that represent features of the environment 100 for each time step.

The perception system 178 may include any number of independent or interconnected systems or functions, and may, for example, include rules-based systems, machine learning based systems, and combinations thereof. Machine learning based systems may be implemented using neural networks, such as any type of DNN (including CNNs or RNNs), long-short term memory networks, etc. In some examples, the perception system 178 can include a fusion subsystem for fusing sensor data and vehicle data from multiple environment sensors 110 and vehicle sensors 111 to generate fused data; a classification subsystem configured for processing the sensor data or the fused data to detect and identify objects in the environment 100 (e.g., to detect and identify a stationary obstacle, or a pedestrian or another vehicle, lanes and lane boundaries, and traffic lights/signs, among other things); and a localization and mapping subsystem for constructing or updating a map of the environment 100 and estimating a position of the vehicle 105 within the map.

The memory 126 may also have stored thereon instructions for implementing other software systems, subsystems, and modules, for example a navigation system, a climate control system, a media player system, a telephone system and/or a messaging system, among others.

Figure 3:
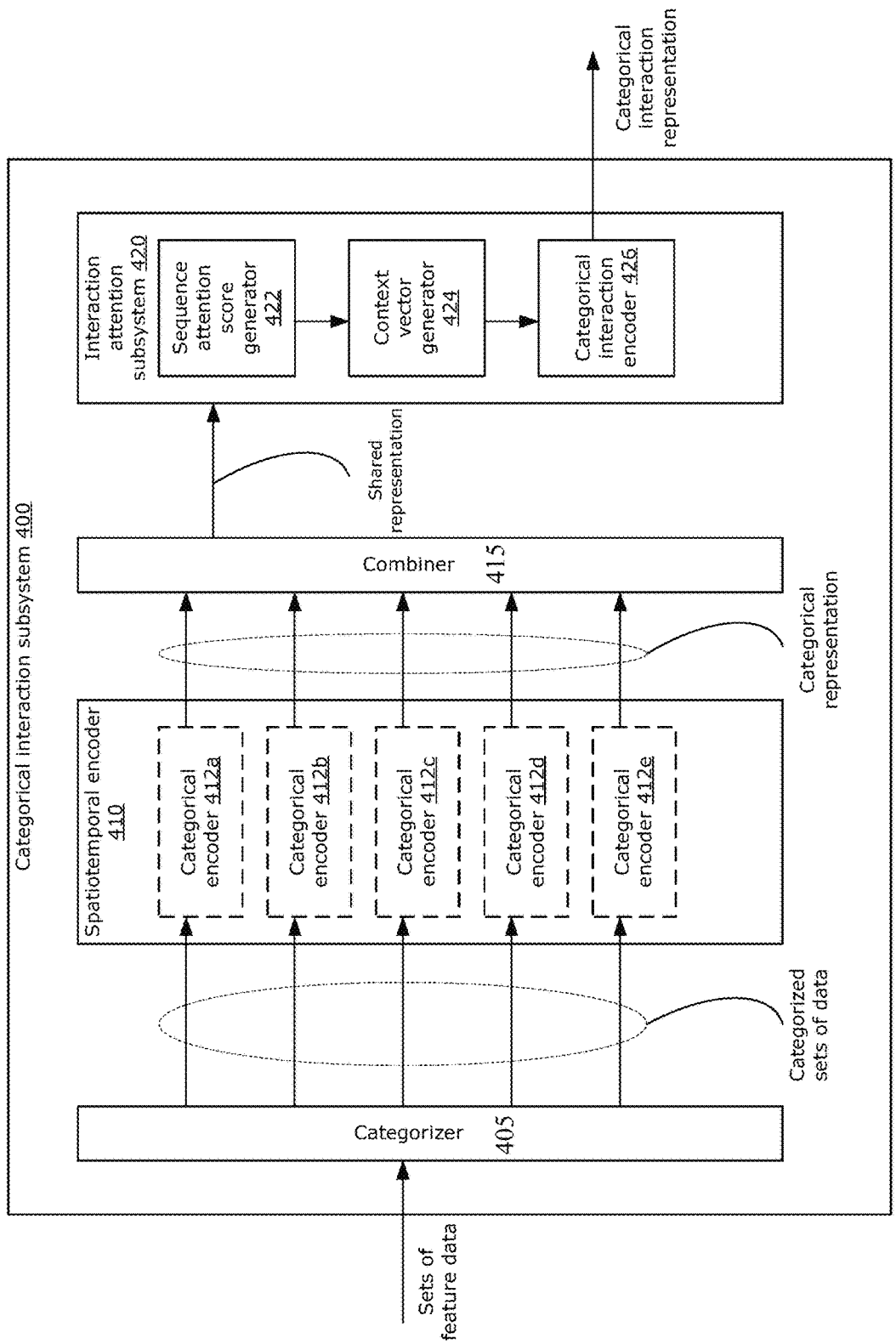
FIG. 3 is a block diagram showing an example subsystem for encoding categorical interactions, in accordance with some embodiments of the present disclosure.

FIG. 3 is a block diagram illustrating example details of the categorical interaction subsystem 400. The categorical interaction subsystem 400 may be a subsystem of the object behavior prediction subsystem 320 (which in turn may be a subsystem of the planning system 300). However, it should be understood that the categorical interaction subsystem 400 may also be used outside of the object behavior prediction subsystem 320, outside of the planning system 300 and/or outside of the ADS or ADAS of the autonomous vehicle 105. For example, the categorical interaction subsystem 400 may be applicable in any computing system in which encoding of interactions between dynamic objects would be useful (e.g., assistive robotics, anomaly detection, or intelligent traffic management, among others).

The categorical interaction subsystem 400 receives feature data as input and generates as output a categorical interaction representation, which is data (e.g., a tensor) representing the strength of interactions between defined object categories (also referred to as categorical interactions). The categorical interaction representation may be provided to a prediction model, such as a perdition model implemented in the behavior predictor 322, to predict the behavior (e.g., action and trajectory) of a dynamic object of interest (i.e. target dynamic object) in the environment 100, at a future time step. A predicted behavior may be a predicted action, a predicted trajectory, or a predicted action-trajectory pair, among other possibilities. A predicted action may be a higher level prediction that encompasses a class of behavior (e.g., a predicted class label for a behavior) and may be associated with an expected future event. The predicted action may not provide data about the specific motion (or trajectory) the dynamic object of interest will perform to carry out the predicted action. A predicted trajectory may be a lower level prediction that predicts the dynamic object of interest's motion or position over a future time interval. A predicted trajectory does not include a label to understand the meaning of the trajectory. For example, if the dynamic object of interest is a pedestrian, the predicted action may be the pedestrian entering another vehicle (which may be associated with a future event that the other vehicle will begin to move) or the pedestrian crossing the road, and the predicted trajectory may be the path the pedestrian takes to reach the other vehicle or to reach the other side of the road. The predicted behavior of dynamic object of interest may then be provided to the motion planning subsystem 315, to plan a motion to be executed by the vehicle 105.

The feature data inputted to the categorical interaction subsystem 400 is data that represents the environment 100 of the vehicle 105. In some examples, feature data may include multiple sets of data. Each set of data may be a respective set of temporal data (i.e., data corresponding to multiple time steps) representing one or more particular features of the environment 100 (e.g., a particular class of objects in the environment 100). Accordingly, a set of feature data may also be referred to as a time series (or observation sequence) feature data, and the feature data inputted to the categorical interaction subsystem 400 may include multiple time series feature data. All time series feature data inputted to the categorical interaction subsystem 400 may be collectively referred to as simply the feature data.

The feature data may include time series data generated by one or more environment sensors 110, vehicle sensors 111 (with little or no processing, also referred to as raw sensor data), and may also include time series data generated by the perception system 178. The feature data inputted to the categorical interaction subsystem 400 may include time series data having different formats (e.g., structured data such as matrix data or tensor data, as well as unstructured data such as point cloud data). For example, the feature data inputted to the categorical interaction subsystem 400 may include feature vector(s), object classification data (e.g., encoded as 2D matrix data), object segmentation data (e.g., encoded as 2D matrix data), object bounding box(es), OGM (s), 2D image(s), and/or point cloud(s), among others. The feature data may thus include time series data representing various features of the environment 100 from an earlier time step up to a current time step. The temporal length of each time series in the feature data may be equal, and the time interval between time steps may also be equal, although it should be understood that this is not a strict requirement. The temporal length of the feature data may be any suitable duration (e.g., up to 10 minutes or more, 10 minutes or less, 5 minutes or less, etc.). The temporal length of the feature data may be predefined, based on the expected environment (e.g., a shorter temporal length may be appropriate for a highly changing dynamic environment may, or a longer temporal length may be appropriate for a slowly changing dynamic environment). A moving time window may be used to ensure the time series of the feature data represents a desired temporal length, and/or a decay factor (or discount factor) may be used to ensure older data gradually diminishes from the feature data.

In some examples, there may be an optional preprocessing subsystem (not shown) in the categorical interaction subsystem 400, to preprocess differently formatted feature data into a common format. For example, each time step in a given time series feature data may be preprocessed into a respective 2D semantic segmentation map (e.g., in the format of a 2D image in which each pixel in the image is assigned a label that identifies one object class of a set of defined object classes), to convert the given time series feature data to a time series of 2D images where each 2D image represents a respective time step.

The multiple time series feature data (after optional preprocessing, if applicable) are received by a categorizer 405, which performs object categorization. For example, the categorizer 405 may use a trained model (e.g., a model whose parameters are learned using a machine learning algorithm during training) to recognize feature data belonging to each object category. The categorizer 405 categorizes the time series feature data into respective object categories according to shared characteristics of objects represented in each time series feature data. Each category is defined by one or more shared object characteristics (e.g., object class, dynamic/static nature, etc.). The object categories may be defined according to the expected environment 100 (e.g., in the context of autonomous driving or assistive driving, the object categories may be pedestrians, vehicles, bicyclists and static objects). At least one object category may also be defined for a specific object of interest (e.g., a pedestrian of interest, such as a pedestrian who is physically closest to the vehicle 105; a vehicle of interest, such as an oncoming vehicle; or any other dynamic object of interest in the environment 100). It should be understood that an object category may be defined for any entity or feature in the environment 100, depending on desired application. For example, anything in the environment 100 that may affect the behavior of a dynamic object (e.g., objects that can be segmented in an image, such as a tree, a hydrant, a human, an anima; as well as objects that may not be easily segmented in an image, such as a curb, a lane marking, etc.) may be the basis for defining an object category.

Any number of object categories may be defined. The defined object categories are generally fixed (e.g., as part of designing a model for the categorizer 405 of the object behavior prediction subsystem 320). The output from the categorizer 405 are categorized sets of time series data (or simply categorized sets of data), where the number of categorized sets correspond to the number of defined object categories. Each object category may have one or more time series feature data. In the example of FIG. 3, there are five defined object categories, and the categorizer 405 outputs five categorized sets of data.

The categorized sets of data are received by a spatiotemporal encoder 410, which encodes the categorized sets of data into respective categorical representations. For each categorized set of data, a respective temporal representation is generated by encoding temporal changes in each categorized set of data (which may contain multiple time series feature data) into a single time series representation. For example, if a categorized set of data contains feature data over m time steps, the categorical representation outputted by the spatiotemporal encoder 410 may be a tensor of m×n where n is the number of feature points (where each feature point is a data point representing a respective entry in a feature vector, or feature map).

The spatiotemporal encoder 410 may be implemented using a deterministic approach (e.g., using deterministic pattern filters, using aggregation, etc.) or a machine-learning based approach (e.g., using Markov chain modeling, RNNs, or any other technique that enables encoding of temporal relationships). For example, the spatiotemporal encoder 410 may be a single neural network that performs encoding for all object categories. Alternatively or additionally, the spatiotemporal encoder 410 may include individual categorical encoders 412a-412e (generally referred to as categorical encoder 412) that perform encoding for respective categories (five categorical encoders 412 for encoding five categories, in the example of FIG. 3). Each categorical encoder 412 may independently be a trained neural network, such as a RNN, or a combination of RNN and CNN. The categorical encoders 412 may operate fully independently from each other, or may share some computations with each other (e.g., sharing computation of weights for convolutional layers) for more computational efficiency. Each categorical encoder 412 receives the corresponding categorized set of data (which may include different time series feature data, representing different features of the environment 100 and/or having different formats) and maps the categorized set of data to a set of feature points (e.g., in the form of a feature vector) for each time step, where temporal changes in the features are encoded in the feature points. The output from each categorical encoder 412 may thus be a time series of feature vectors, referred to herein as a categorical representation.

The categorical representations for the respective object categories are outputted by spatiotemporal encoder 410 and received by a combiner 415. The combiner 412 combines the categorical representations to form a single shared representation that is a single representation of the spatiotemporal changes in each category. For example, the combiner 415 may perform time-wise concatenation of the categorical representations to output the single shared representation. Time-wise concatenation means that data belonging to the same time step are concatenated together. For example, if each categorical representation is a respective m×n tensor, where m is the number of time steps and n is the number of feature points, then the categorical representations may be concatenated together according to the time step index from 1 to m, to obtain a single shared representation of dimension m×5n (where 5 corresponds to the number of defined object categories in the example of FIG. 3). Other techniques may be used by the combiner 415 to generate the shared representation, such as averaging operations (e.g., averaging all categorical representations for each given time step), or max operations (e.g., taking the maximum value among all categorical representations for each given time step), among others.

The single shared representation is provided to an interaction attention subsystem 420. The interaction attention subsystem 420 generates a categorical interaction representation, which is a weighted representation of the environment where the weights are computed based on temporal changes of each object category in the single shared representation. Any suitable attention mechanism may be used by the interaction attention subsystem 420 to generate the attention scores, context vector and attention vector. For example, a suitable attention mechanism is described by Luong et al. in "Effective approaches to attention-based neural machine translation," arXiv:1508.04025, 2015. The attention vector generated by the interaction attention subsystem 420 is referred to as the categorical interaction representation, because the attention vector is a vector representing the contribution (or interaction) of features in one object category to the features in another object category.

In the example of FIG. 3, the interaction attention subsystem 420 includes a sequence attention score generator 422, a context vector generator 424, and a categorical interaction encoder 426. In other examples, there may not be individual functional blocks 422, 424, 426, and the interaction attention subsystem 420 may instead implement the operations of functional blocks 422, 424, 426 using greater or fewer functions. The interaction attention subsystem 420 will be described herein with respect to the functional blocks 422, 424, 426.

The sequence attention score generator 422 generates a respective weight score for each time step of the single shared representation. The weight scores may be learned by the sequence attention score generator 422 based on the contribution of each feature to the prediction task to be performed by the behavior predictor 322. The sequence attention score generator 422 may implement a fully connected layer to perform this learning. If the shared representation has a size of m×k (where m is the number of time steps, and k is the number of combined feature points), then the weight scores may also be stored in a weight score matrix of size m×k. The weight score matrix is multiplied by the k×1 feature points in the last time step of the shared representation, and the resulting m×1 vector is normalized (e.g., using a softmax operation) so that its entries sum to 1. The result of this normalization is a m×1 vector of attention scores representing the attention (or weights) that should be applied to each of the features at each time step.

The attention scores generated by the sequence attention score generator 422 are provided to the context vector generator 424. At the context vector generator 424, the attention scores generated for each time step are applied to (e.g., multiplied with) the feature points of the single shared representation for each respective time step. For example, the m×1 vector of attention scores is transposed and multiplied with the m×k single shared representation. The result of this operation is a context vector of size 1×k, where each entry is a weighted sum representing the contribution of each feature point of the single shared representation to the temporal changes in the time series (i.e., to the features in the last time step of the single shared representation).

The context vector generated by the context vector generator 424 is provided to the categorical interaction encoder 426. At the categorical interaction encoder 426, the context vector is combined (e.g., concatenated) with the features of the last time step of the single shared representation and then processed with a fully connected network. The fully connected network effectively performs an embedding operation to reduce the dimension of the data and to generate a categorical interaction representation.

The categorical interaction representation is the output of the categorical interaction subsystem 400. The categorical interaction representation is a unified representation of size $c_i$, where $c_i$ is the output dimension of the last layer of a fully connected network included in the categorical interaction encoder 426) in the categorical interaction subsystem 400. The categorical interaction representation is a vector of weights, where the weights represent the relative contribution of temporal changes in the features in each object category to the features of all object categories at the last time step.

The categorical interaction subsystem 400 may include multiple trained neural networks (e.g., trained RNNs included in the spatiotemporal encoder 410, and a trained fully connected network may be included in the interaction attention subsystem 420). Some of the neural networks included in the categorical interaction subsystem 400 (e.g., neural networks used for categorizing the feature data, or neural networks used to extract feature data) may be trained offline (e.g., prior to being included in the object behavior prediction subsystem 320), for example at a one or more physical machines or one or more virtual machines using training data (e.g. a sequence of images of sensed environments (generally referred to a scenes) from an external database. Any neural networks implemented in the spatiotemporal encoder 410 (e.g., neural networks implemented in the categorical encoders 412) should be trained end-to-end. Any suitable training techniques may be used for end-to-end training of the neural networks included in the object behavior prediction subsystem 320 (e.g., performing forward propagation using samples of labeled training data, computing a loss using a loss function for object behavior prediction subsystem 320 and performing backpropagation with gradient descent in order to learn (i.e. optimize) the parameters of the neural networks included in the object behavior prediction subsystem 320).

The categorical interaction representation generated by of the categorical interaction subsystem 400 may be provided to the object behavior prediction subsystem 320.

Figure 4:
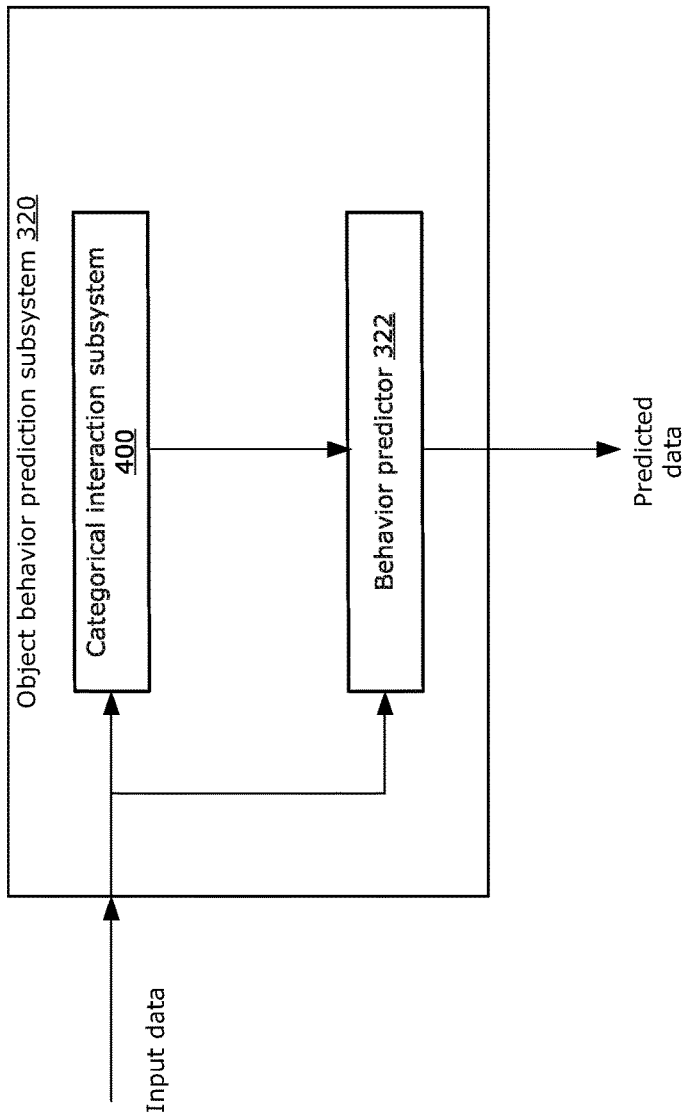
FIG. 4 is a block diagram showing an example subsystem for generating object behavior predictions, in accordance with some embodiments of the present disclosure.

FIG. 4 is a block diagram illustrating example details of the object behavior prediction subsystem 320. The object behavior prediction subsystem 320 may be part of the planning system 300 of the vehicle 105. In the following discussion, the object behavior prediction subsystem 320 will be described in the context of predicting behavior of a dynamic object of interest (e.g. a pedestrian) in the environment 100 of the vehicle 105. However, it should be understood that the behavior prediction subsystem 320 may also be used outside of the planning system 300 and/or outside of the autonomous vehicle 105, for predicting the behavior of any dynamic object of interest in a sensed environment. For example, instructions of the behavior prediction subsystem 320 may be stored in memory and executed by processing unit(s) of any computing system in which prediction of behavior of a dynamic object of interest (including behavior due to interaction of the dynamic object of interest with other objects) would be useful (e.g., assistive robotics, anomaly detection, or intelligent traffic management, among others).

The input data to the object behavior prediction subsystem 320 may include unprocessed (or only slightly processed) data from the environment sensors 110, vehicle sensors 111, and may also include processed data generated by the perception system 178 from the environment sensors 110, vehicle sensors 111. It should be noted that the input data to the object behavior prediction subsystem 320 includes the feature data that is inputted to the categorical interaction subsystem 400. Additionally, the input data may include data representing dynamics of a plurality of objects in the environment 100 as well as data representing the state of the vehicle 105 itself (e.g., data representing a current speed, current acceleration, etc.). Data representing dynamics of a plurality of objects in the environment 100 may include data representing object trajectories (e.g., trajectories of dynamic objects in the environment 100, which may be represented as 2D maps), data representing object locations (e.g., locations of objects in the environment 100 represented as one or more OGMs), data representing object motions (e.g., motions of dynamic objects in the environment 100). The input data to the behavior prediction subsystem 320 includes temporal data (e.g., object trajectories), and may also include non-temporal data (e.g., current speed of the vehicle 105). As previously described, the categorical interaction subsystem 400 receives a portion of the input data (i.e., the feature data as described previously) and generates a categorical interaction representation. The categorical interaction representation is provided to the behavior predictor 322.

The behavior predictor 322 also receives at least a portion of the input data (e.g., data representing object trajectories, object locations, vehicle state, etc.). The behavior predictor 322 may be any neural network (e.g., a recurrent decoder network, a feedforward generative neural network, etc.) that can be trained to generate predicted data representing predicted behavior of one or more dynamic objects of interest. In particular, the behavior predictor 322 may include any neural network that can be trained to receive the categorical interaction representation as input (among other inputs) and generate predicted data representative of predicted behavior of a dynamic object of interest. The predicted data is provided as part of the input to the motion planning subsystem 315. The output of the behavior predictor 322 may include different types of predicted data, which may vary depending on the specific application (e.g., depending on the input required by the motion planning subsystem 315). For example, the predicted data may include a predicted trajectory for a dynamic object of interest (e.g., a predicted trajectory of a pedestrian over a future time duration, which may be represented as a 2D map), a predicted future location of a dynamic object of interest (e.g., a predicted location of a pedestrian at a future time step, which may be represented as a 2D OGM) and/or a predicted behavior for a dynamic object of interest (e.g., a predicted road crossing action for a pedestrian at a future time step, which may be represented as a vector or scalar value).

The predicted data output by the behavior predictor 322 may be further provided as input to the motion planning subsystem 315. The motion planning subsystem 315 may use the predicted data, together with other input data (e.g., processed and/or unprocessed data from the sensors 110, 111) to generate a planned path for the vehicle 105.

The object behavior prediction subsystem 320 may be trained offline (e.g., at one or more physical machines or one or more virtual machines, prior deployment to the ADS or ADAS of the vehicle 105) using training data from an external dataset. In particular, the categorical interaction subsystem 400 may already be trained, and the behavior predictor 322 may be trained using the training data (e.g. images, trajectories, motion of the vehicle 105, etc.) and also using categorical interaction representations generated by the categorical interaction subsystem 400 from the training data. Any suitable training techniques may be used, depending on the type of neural network implemented in the behavior predictor 322.

Figure 5:
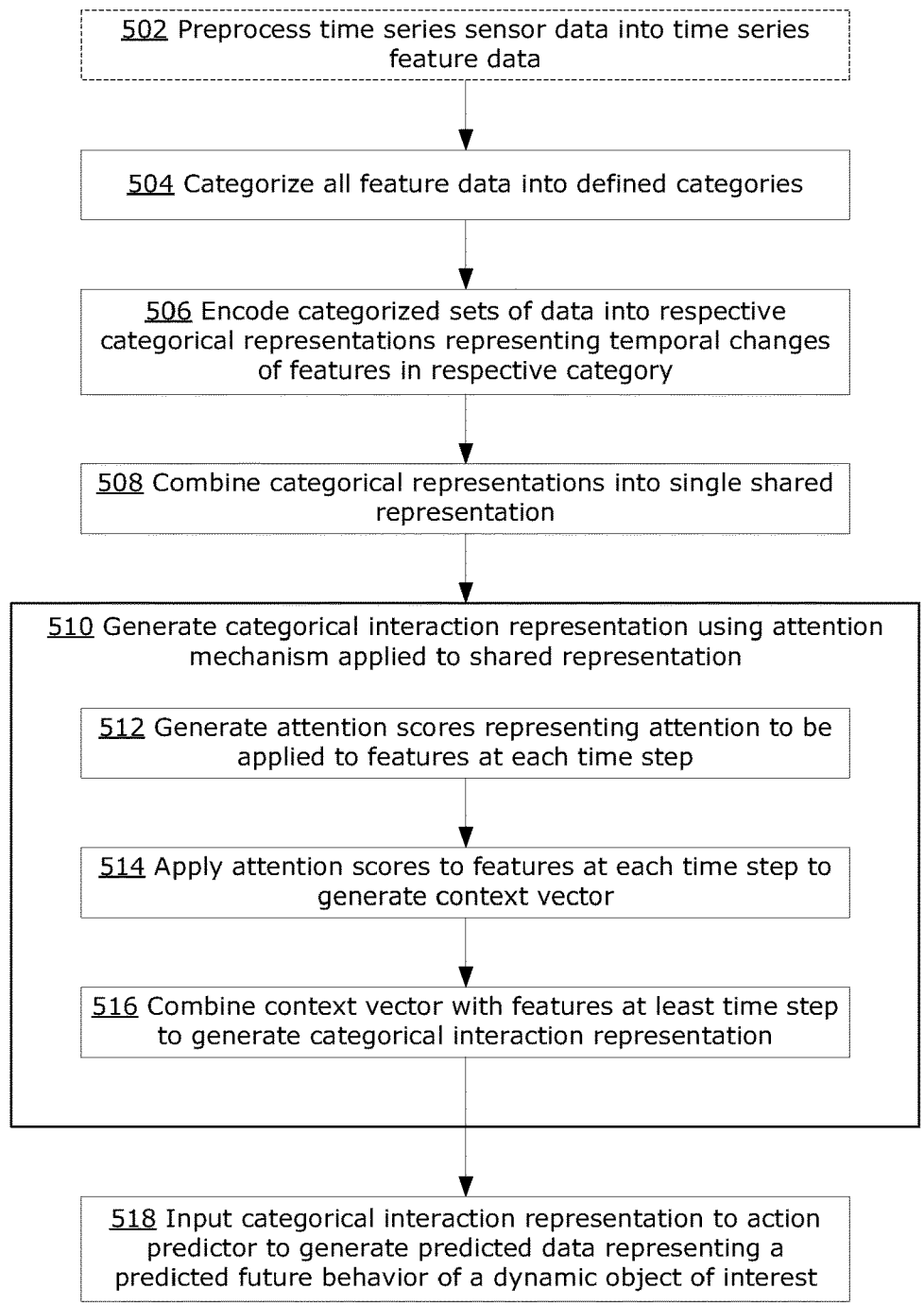
FIG. 5 is a flowchart of an example method for predicting behavior of a dynamic object, in accordance with some embodiments of the present disclosure.

FIG. 5 is a flowchart illustrating an example method 500 for generating a prediction of behavior (e.g. behavior predicted) of a dynamic object of interest, based on categorical interactions. The method 500 may be performed using the object behavior prediction subsystem 320, and in particular using the categorical interaction subsystem 400, for example.

At optional step 502, a time series of sensor data (i.e., sensor data over a sequence of time steps) may be preprocessed into a time series of feature data (i.e., feature data over the same sequence of time steps). For example, sensor data generated by an environmental sensor 110 over a plurality of time steps may be preprocessed into a plurality of 2D maps (e.g., OGMs) representing the location of classified objects (i.e. objects classified into one of the plurality of object categories) over the time steps. In some examples, preprocessing may be used to generate at least one time series of feature data used at next step 504, and another time series of feature data may not require preprocessing.

At 504, all of the feature data (including any time series of feature data resulting from optional preprocessing at step 502) are categorized into one of a plurality of defined object categories (e.g., using the operations described above with respect to the categorizer 405). At least one of the object categories may be defined to be a specific dynamic object of interest. One or more shared characteristics (e.g., object class, dynamic or static nature of the data, etc.) are defined for each object category, and feature data representing an object that has the shared characteristic(s) defined for a given object category is grouped into that given object category. The categorized groups are referred to as categorized sets of data, where each object category may have one or more time series of feature data.

At 506, the categorized sets of data are encoded into respective categorical representations (e.g., using the operations described above with respect to the spatiotemporal encoder 410). A respective neural network (e.g., RNN) may perform encoding for each categorized set of data. Each categorical representation is a representation of the temporal change of all features belonging to the corresponding object category. For example, each categorical representation may be a time series of feature vectors (or feature maps) representing the features of the corresponding object category at each time step, including temporal changes of the features.

At 508, the categorical representations from all defined object categories are combined into a single shared representation (e.g., using the operations described above with respect to the combiner 415). For example, the single shared representation may be a concatenation of the categorical representations, according to time step.

At 510, using an attention mechanism, a categorical interaction representation is generated (e.g., using the operations described above with respect to the interaction attention subsystem 420) from the single shared representation. Generally, an attention mechanism involves learning attention scores (representing the attention (or weight) to be applied to each of the features at each time step), computing a context vector (representing a weighted sum representing the contribution of the features of each time step the temporal changes in the time series), and learning an attention vector (representing the relative contribution of temporal changes in the features in each object category to the features of all object categories at the last time step). As previously mentioned, any suitable attention mechanism may be used to generate an attention vector that is the categorical interaction representation. For example, step 510 may be performed using steps 512, 514 and 516 to generate the attention scores, context vector, and categorical interaction representation, respectively.

At 512, attention scores are generated (e.g., using the operations described above with respect to the sequence attention score generation 422), representing the contribution of features at each time step in the shared representation to features at the last time step of the shared representation.

At 514, the attention scores are applied to features at each time step of the single shared representation, to generate the context vector (e.g., using the operations described above with respect to the context vector generator 424).

At 516, the context vector is combined with features at the last time step of the single shared representation, to generate the categorical interaction representation (e.g., using the operations described above with respect to the categorical interaction encoder 426).

At 518, the categorical interaction representation generated using the attention mechanism is provided as input to the behavior predictor 322 (which may include any suitable a trained neural network) to generated predicted data representing a predicted future behavior of a dynamic object of interest (e.g., using the behavior predictor 322). The categorical interaction representation is provided as input together with other input data to the behavior predictor 322, and the input data required by the behavior predictor 322 may depend on the design of the neural network included in the behavior predictor 322. The predicted data representing predicted future behavior of a dynamic object of interest may include a trajectory of the dynamic object of interest (e.g., a pedestrian of interest, a vehicle of interest, or other road user of interest, in the context of autonomous driving) over one or more future time steps, for example.

The predicted data representing predicted future behavior of a dynamic object of interest may be used to generate other predictions and/or planning operations (e.g., for motion planning by the motion planning subsystem 315).

In various examples, the present disclosure has described methods and systems that enable predicting behavior of a dynamic object of interest in the environment. In particular, the present disclosure has described methods and systems that enable encoding of interactions between different object categories. Time series feature data are categorized into defined object categories, a single shared representation is generated by combining individual categorical representations, and an attention mechanism is used to convert the single shared representation into a single categorical interaction representation, which is a weighted vector encoding the interactions between different object categories.

The present disclosure enables modelling (i.e. encoding) of interactions based on interactions of defined object categories, rather than interactions of between respective individual objects and other objects in a sensed environment. This enables better scalability compared to some existing solutions, because the number of object categories are defined and not variable. Encoding of interactions by defined object categories, instead of by interactions between respective individual objects and other objects in a sensed environment, also may result in better computational efficiency and lower usage of memory resources, compared to some existing solutions.

Although the present disclosure has described examples in the context of autonomous driving systems, it should be understood that the present disclosure may be suitable in various applications in which there are multiple interacting objects. For example, examples of the present disclosure may be useful for assistive robotics, anomaly detection, or intelligent traffic management, among others, in which multiple interacting agents and elements are involved. It should be understood that the present disclosure is not intended to be limited to specific types of environmental features or specific types of task objectives.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method for predicting behavior of a dynamic object of interest in an environment of a vehicle, the method comprising:
   receiving a plurality of time series of feature data, each time series of feature data representing a respective feature of a plurality of objects in the environment over a plurality of time steps, the plurality of objects including a dynamic object of interest;
   categorizing each time series of feature data into one of a plurality of defined object categories, each defined object category being defined by one or more shared characteristics of objects belonging to that defined object category, to obtain a categorized set of data for each defined object category, each categorized set of data containing one or more time series of feature data representing one or more objects belonging to the respective defined object category;
   for each given categorized set of data belonging to a given defined object category, encoding, using a spatiotemporal encoder, the one or more time series of feature data belonging to the given categorized set of data into a single categorical representation, the single categorical representation being a time series of feature vectors representing temporal change of features within the given defined object category over the plurality of time steps, wherein a respective plurality of categorical representations is obtained for the plurality of defined object categories;
   combining the plurality of categorical representations into a single shared representation that is a single time series of tensors that represents spatiotemporal changes in each of the plurality of defined object categories over the plurality of time steps;
   generate a categorical interaction representation based on the single shared representation, the categorical interaction representation being a weighted representation of the single shared representation representing contributions of temporal change in each defined object category to a final time step of the single shared representation; and
   generate predicted data representing a predicted future behavior of the dynamic object of interest based on the categorical interaction representation and data representing dynamics of the plurality of objects and data representing a state of the vehicle.

2. The method of claim 1, wherein combining the categorical representations comprises concatenating the categorical representations according to time step, to generate the single shared representation.

3. The method of claim 1, wherein encoding each categorized set of data comprises:
   for the given categorized set of data belonging to the given defined object category, providing the one or more time series of feature data to a trained neural network to generate the time series of feature vectors as the single categorical representation for the given object category.

4. The method of claim 3, wherein the trained neural network is a recursive neural network, a convolutional neural network, or a combined recursive and convolutional neural network.

5. The method of claim 1, wherein at least one defined object category is specific to the dynamic object of interest.

6. The method of claim 1, further comprising:
   receiving a time series of sensor data generated by a sensor; and
   preprocessing the time series of sensor data into one time series of feature data, the one time series of feature data being included in the received plurality of time series of feature data.

7. The method of claim 1, further comprising:
   providing the predicted data representing the predicted future behavior of the dynamic object of interest to a motion planning subsystem of the vehicle, to generate a planned path for the vehicle.

8. A computing system for predicting behavior of a dynamic object of interest in an environment of a vehicle, the computing system comprising:
   a processor system configured to execute instructions to cause an object behavior prediction subsystem of the computing system to:
   receive a plurality of time series of feature data, each time series of feature data representing a respective feature of a plurality of objects in the environment over a plurality of time steps, the plurality of objects including a dynamic object of interest;
   categorize each time series of feature data into one of a plurality of defined object categories, each defined object category being defined by one or more shared characteristics of objects belonging to that defined object category, to obtain a categorized set of data for each defined object category, each categorized set of data containing one or more time series of feature data representing one or more objects belonging to the respective defined object category;

for each given categorized set of data belonging to a given defined object category, encode, using a spatiotemporal encoder, the one or more time series of feature data belonging to the given categorized set of data into a single categorical representation, the single categorical representation being a time series of feature vectors representing temporal change of features within the given defined object category over the plurality of time steps, wherein a respective plurality of categorical representations is obtained for the plurality of defined object categories;

combine the plurality of categorical representations into a single shared representation that is a single time series of tensors that represents spatiotemporal changes in each of the plurality of defined object categories over the plurality of time steps;

generate a categorical interaction representation based on the single shared representation, the categorical interaction representation being a weighted vector representing contributions of temporal change in each defined object category to a final time step of the shared representation; and generate predicted data based at least on the categorical interaction representation, data representing dynamics of the objects, and data representing a state of the vehicle, the predicted data representing a predicted future behavior of the dynamic object of interest.

9. The computing system of claim 8, wherein the processing system is configured to execute instructions to combine the categorical representations by concatenating the categorical representations according to time step, to generate the single shared representation.

10. The computing system of claim 8, wherein the processing system is configured to execute instructions to encode each categorized set of data by:

for the given categorized set of data belonging to the given defined object category, providing the one or more time series of feature data to a trained neural network to generate the time series of feature vectors as the single categorical representation for the given object category.

11. The computing system of claim 10, wherein the trained neural network is a recursive neural network, a convolutional neural network, or a combined recursive and convolutional neural network.

12. The computing system of claim 8, wherein at least one defined object category is specific to the dynamic object of interest.

13. The computing system of claim 8, wherein the processing system is configured to execute instructions to cause the computing system to:

receive a time series of sensor data generated by a sensor; and preprocessing the time series of sensor data into one time series of feature data, the one time series of feature data being included in the received plurality of time series of feature data.

14. The computing system of claim 8, wherein the vehicle is an autonomous vehicle, wherein the computing system is implemented in the autonomous vehicle, and wherein the processing system is configured to execute instructions to cause a motion planning subsystem of the autonomous vehicle to:

receive the predicted data representing predicted future behavior of the dynamic object of interest as input; and generate a planned path for the autonomous vehicle.

15. A non-transitory computer readable medium comprising computer-executable instructions to implement an object behavior prediction subsystem to predict behavior of a dynamic object of interest in a sensed environment of a vehicle, wherein the instructions, when executed by a processing system of a computing system, cause the computing system to:

receive a plurality of time series of feature data, each time series of feature data representing a respective feature of a plurality of objects in an environment over a plurality of time steps, the plurality of objects including a dynamic object of interest;

categorize each time series of feature data into one of a plurality of defined object categories, each defined object category being defined by one or more shared characteristics of objects belonging to that defined object category, to obtain a categorized set of data for each defined object category, each categorized set of data containing one or more time series of feature data representing one or more objects belonging to the respective defined object category;

for each given categorized set of data belonging to a given defined object category, encode, using a spatiotemporal encoder, the one or more time series of feature data belonging to the given categorized set of data into a single categorical representation, the single categorical representation being a time series of feature vectors representing temporal change of features within the given defined object category over the plurality of time steps, wherein a respective plurality of categorical representations is obtained for the plurality of defined object categories;

combine the categorical representations into a single shared representation that is a single time series of tensors that represents spatiotemporal changes in each of the plurality of defined object categories over the plurality of time steps;

generate a categorical interaction representation based on the single shared representation, the categorical interaction representation being a weighted vector representing contributions of temporal change in each defined object category to a final time step of the shared representation; and generate predicted data based on the categorical interaction representation, data representing dynamics of the plurality of objects, and data representing a state of the vehicle, the predicted data representing a predicted future behavior of the dynamic object of interest.

16. The non-transitory computer readable medium of claim 15, wherein the instructions cause the computing system to combine the categorical representations by concatenating the categorical representations according to time step, to generate the single shared representation.

17. The non-transitory computer readable medium of claim 15, wherein the instructions cause the computing system to encode each categorized set of data by:

for the given categorized set of data belonging to the given defined object category, providing the one or more time series of feature data to a trained neural network to generate the time series of feature vectors as the single categorical representation for the given object category.

18. The non-transitory computer readable medium of claim 15, wherein at least one defined object category is specific to the dynamic object of interest.

19. The non-transitory computer readable medium of claim 15, wherein the instructions cause the computing system to:
- receive a time series of sensor data generated by a sensor; and
- preprocess the time series of sensor data into one time series of feature data, the one time series of feature data being included in the received plurality of time series of feature data.

20. The non-transitory computer readable medium of claim 15, wherein the vehicle is an autonomous vehicle, and where the instructions cause the computing system to implement a motion planning subsystem of an autonomous vehicle to:
- receive the predicted data representing the predicted future behavior of the dynamic object of interest as input; and
- generate a planned path for the autonomous vehicle.

* * * * *